United States Patent [19]

Polites et al.

[11] Patent Number: 5,531,093
[45] Date of Patent: Jul. 2, 1996

[54] MEANS FOR POSITIONING AND REPOSITIONING SCANNING INSTRUMENTS

[75] Inventors: Michael E. Polites; Dean C. Alhorn, both of Huntsville, Ala.

[73] Assignee: The United States of America as represented by the Administrator of the National Aeronautics and Space Administration, Washington, D.C.

[21] Appl. No.: 422,967

[22] Filed: Apr. 17, 1995

[51] Int. Cl.⁶ .................................................... G01C 25/00
[52] U.S. Cl. ........................................ 73/1 E; 364/571.05
[58] Field of Search . 73/1 E, 1 R; 364/571.01–571.08; 74/61

[56] References Cited

U.S. PATENT DOCUMENTS

| | | | |
|---|---|---|---|
| 4,488,249 | 12/1984 | Baker | 73/1 E X |
| 4,498,778 | 2/1985 | White | 364/571.02 X |
| 4,791,591 | 12/1988 | Asanuma et al. | 364/571.04 |
| 5,129,600 | 7/1992 | Polites | 74/61 X |
| 5,396,815 | 3/1995 | Polites et al. | 74/61 |
| 5,430,666 | 7/1995 | De Angelis et al. | 73/1 R X |

OTHER PUBLICATIONS

*Patent Abstracts of Japan* Grp p. 151 vol. 6, No. 212 ABS Pub. Date Oct. 26, 1982 (57–118165) "Device for Measuring Electric Field Intensity".

*Patent Abstracts of Japan* Grp p. 544 vol. 11, No. 40 Abs. Pub. date Feb. 5, 1987 (61–210318) "Laser Beam Scanner".

*Primary Examiner*—Thomas P. Noland
*Attorney, Agent, or Firm*—Jerry L. Seemann

[57] ABSTRACT

A method for positioning a scanning instrument to point toward the center of the desired scan wherein the scan is achieved by rotating unbalanced masses (RUMs) rotating about fixed axes of rotation relative to and associated with the instrument, the RUMs being supported on drive shafts spaced from the center of the mass of the instrument and rotating 180 degrees out-of-phase with each other and in planes parallel to each other to achieve the scan. The elevation and cross-elevation angles of the instrument are sensed to determine any offset and offset time rate-of-change and the magnitude and direction are converted to a RUM cycle angular velocity component to be superimposed on the nominal velocity of the RUMs. This RUM angular velocity component modulates the RUM angular velocity to cause the speed of the RUMs to increase and decrease during each revolution to drive the instrument toward the desired center of the scan.

6 Claims, 1 Drawing Sheet

MEANS FOR POSITIONING AND REPOSITIONING SCANNING INSTRUMENTS

ORIGIN OF THE INVENTION

The invention described herein was made by employees of the United States Government and may be manufactured and used by or for the Government of the United States of America for Governmental purposes without payment of any royalties thereon or therefor.

FIELD OF THE INVENTION

This invention in one of its aspects relates to scanning devices or instruments focused on objects in or from outer space. In a more specific aspect the invention is concerned with instruments whose scanning is produced by rotating unbalanced-mass devices, and particularly gimballed scanning instruments. In a still more specific aspect the invention pertains to means for positioning and repositioning such scanning instruments.

BACKGROUND OF THE INVENTION

As can be imagined, scanning instruments are an important aspect of space science. In addition to their use in scanning the earth and other planets, x-ray, gamma-ray, and similar scanning instruments perform additional functions important in space exploration. Examples of such instruments are sensors, telescopes and electronic devices carried by space platforms such as a space shuttle, a space station, by experimental balloons, and by free-flying spacecraft.

To achieve the scan pattern a drive means must be provided which impart to the payload an oscillatory motion. Such drive means are generally known, particularly in space exploration. Various forms of machines or apparatus have been employed for controllably conferring on scanning instruments predetermined scan patterns. They include control moment gyroscopes, reaction wheels, torque motors, reaction control systems, and various combinations of such apparatus.

One disadvantage of utilizing such scan generating devices is power consumption. For this reason, whether scanning with a ground-based, space-based, or balloon-borne gimballed payload a preferred drive means which is particularly effective is a rotating unbalanced-mass, or RUM, device. This device is the subject of our U.S. Pat. No. 5,129,600.

RUM devices are a new and efficient way to generate scan patterns using gimballed payloads such as x-ray telescopes or other scientific instruments. A RUM device consists of a mass, m, on a lever arm r, located at a distance, d, from the center-of-mass of the gimballed payload on which it is mounted. The mass is driven at a constant angular velocity $\omega$ which produces a cyclical centrifugal force $m\omega^2 r$ on the payload. This force, in turn, produces a cyclic torque, about the payload center-of-mass, with an amplitude of $m\omega^2 rd$. The period of this cyclic torque is the same as the period of rotation of the RUMs. Two RUM devices are required to scan with-gimballed payloads. RUMs are mounted on each end of the payload and they rotate 180° out-of-phase producing a cyclic torque couple having an amplitude of $2m\omega^2 rd$.

RUM devices are superior to previous scanning devices in terms of power, weight, cost, and accuracy, but such apparatus is still not totally satisfactory. Even though operating power requirements are less than those required for operating other scan generating devices, the required positioning and repositioning, or pointing, means are subject to improvement. RUM devices currently require an auxiliary control system to position and reposition the scan pattern relative to a target or a number of targets. Such control means confer on the payload or instrument a slow complementary motion that keeps the Scan centered on the target.

Prior methods of generating control torques for pointing freeflying/tethered satellites and gimballed payloads employed reaction wheels, control moment gyroscopes (CMGs), reaction control system (RCS) thrusters, and gimbal torque motors.

Pointing and scanning with reaction wheels, CMGs, and gimbal torque motors characteristically require a great deal of power. Reaction wheels and CMGs also require a momentum desaturation system. RCS systems can only generate control torques until the RCS propellant is depleted. In addition, they are also normally nonlinear devices that produce either full thrust or no thrust. This characteristic makes them unsuitable for applications where precise pointing and scanning are required. Gimbal torque motors require gimbals and a base structure to torque against, which renders them unsuitable for free-flying spacecraft and satellites. Also, reaction forces and torques acting against the base structure tend to couple back into the payload or instrument being pointed, causing pointing/scanning errors and/or stability problems. It can be seen, then, that despite the desirability of RUMs, there is room for improvement in their operation. A needed improvement is the elimination of such pointing, that is, positioning and repositioning, equipment, normally referred to as auxiliary control systems. We have now found that this can be accomplished.

SUMMARY OF THE INVENTION

As indicated hereinbefore, pointing means are provided for positioning and repositioning a scanning instrument when the instrument is offset from its center-of-scan and must be pointed to that center-of-scan. The scanning instrument is the type whose scan pattern is achieved by rotating unbalanced-masses (RUMs). Mounted on the scanning instrument are first and second RUMs supported on respective drive shafts. They are spaced from the center-of-mass of the instrument, and adapted to rotate 180 degrees out-of-phase with each other, with their planes-of-rotation parallel to each other, and at a constant angular velocity. The centrifugal forces caused by rotation of the RUMs create time-varying relatively large-amplitude/high-frequency operating or nominal reaction forces and torques which act on the instrument to move its line-of-sight in a predetermined, repetitive, scan pattern. This invention is thus based on the discovery that, in RUM operation, if we superimpose a cyclic angular velocity component on top of, or in addition to, the nominal constant angular velocity component of the rotating RUMs, we can introduce an additional force, and hence a torque, on the device on which the RUMs are mounted in order to position and reposition the scan center. And, as indicated, the period of this cyclic component is the same as the period of rotation of the RUMs. The means for pointing the RUM-mounted instrument according to the invention hence include sensing means producing elevation and cross-elevation departure angles from a given center-of-scan, and sensing means producing the rate of change in the elevation and cross-elevation departure angles. Also included is a programmable logic controller means determining scan errors and rate-of-change in the scan errors in both elevation and cross-elevation axes from the departure angles and their rate-of-change, and for converting these errors and error rates-of-change to a RUM cyclic angular velocity component and to a locus in the RUM orbit where the peak of this cyclic component is to be applied. Means responsive to the controller means superimpose on the RUM constant angular velocity during a given cycle, the cyclic component phased in the RUM cycle to induce a torque which when combined with the operating high frequency torque produces a resultant torque vector over the RUM cycle which acts to compensate for the departure from the center-of-scan.

DETAILED DESCRIPTION OF THE INVENTION

Figure 1:
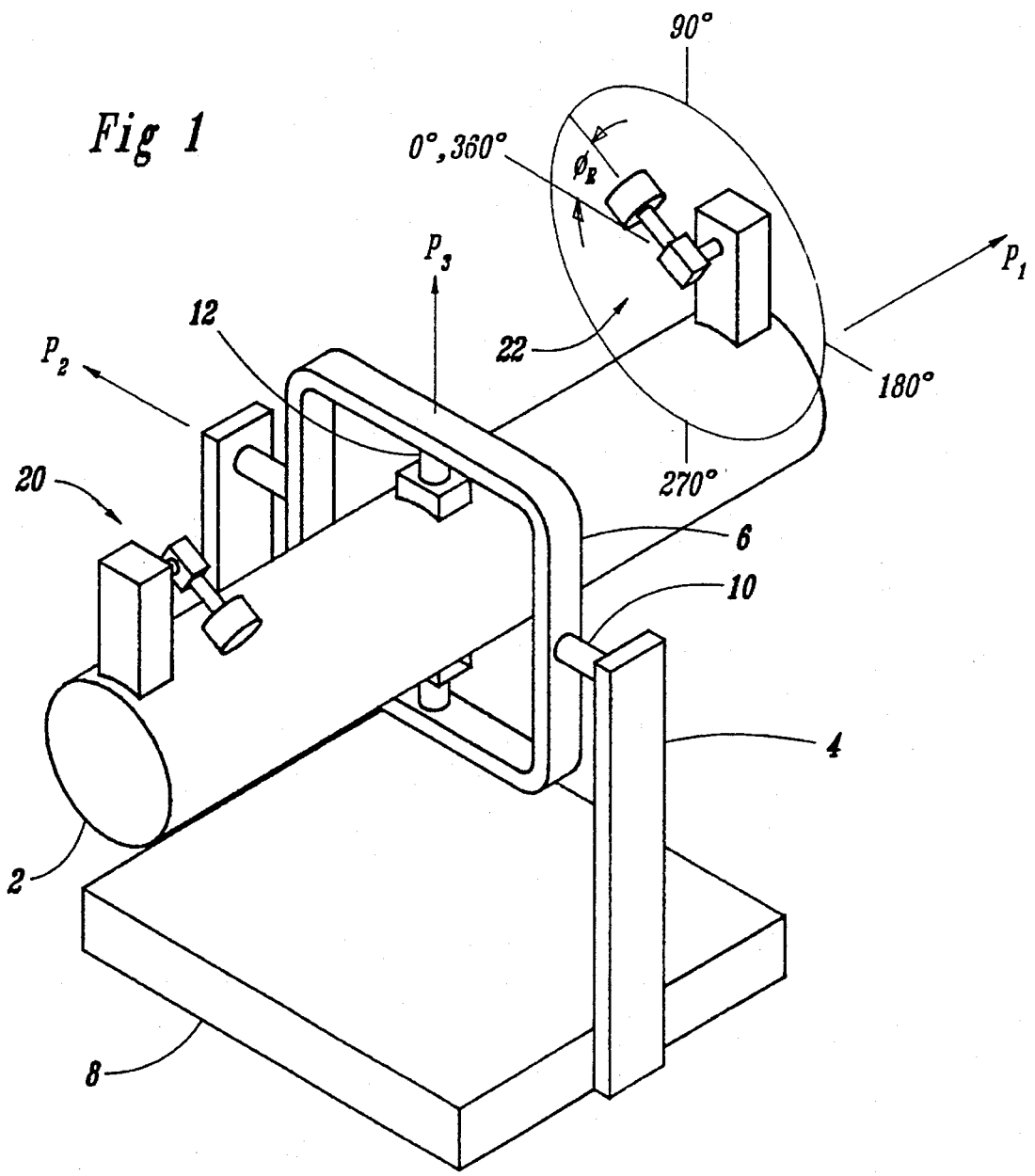

In addition to eliminating an auxiliary control system, and this is important as emphasized in Ser. No. 08/123,629 filed Sep. 15, 1993, and now U.S. Pat. No. 5,396,815, the process of augmenting or modulating the constant angular velocity required for scanning with RUM devices yields some interesting results. These results are quite surprising in the light of what was learned during the operation of RUM devices described in U.S. Pat. No. 5,129,600. Throughout that patent the fact that drive means are adapted for rotatably driving the shaft at a constant angular velocity is confirmed. It is pointed out that when steady state operating conditions are attained, it is desired that the angular velocity of the masses not be accelerated or decelerated. The angular velocity is adjusted up or down for shorter or longer scan periods, but once the scan period is established, the velocity must be constant to maintain that scan period.

Herein the desired scan period is still maintained by retaining a constant angular velocity, but superimposed on that angular velocity, once per cycle, is a modulating cyclic component. Since this cyclic component is introduced on top of, or in addition to, the nominal angular velocity once each revolution by the rotating unbalanced-masses, a net torque is generated each revolution. This generated net torque is, in effect, a vector. It has magnitude and direction. The magnitude of this torque vector is proportional to the amplitude of the cyclic component of the angular velocity, and its direction is a function of the point or locus in the orbit where the cyclic component's peak occurs. It remains, then, to determine the magnitude of the resultant torque vector, and to define the locus in the circle where the cyclic component peak occurs-in other words, where in the 360 degree cycle or RUM orbit the peak of the cyclic component of the RUM angular velocity should be effected. This, of course, is engineering within the skill of the art. Programmable logic controllers are commonly employed in industry which respond to position and rate sensors. They are in wide use in the machine tool industry for lathes, milling machines, and the like. It will be apparent that modifications of these computerized sensing devices can be made to establish the cyclic component's amplitude and phase in a given RUM revolution. From a process point of view, on the other hand, it will be helpful to discuss the steps of the invention herein. This process includes: measuring elevation and cross-elevation angles and the rate-of-change of these angles to determine any offset and offset time rate-of-change, calibrating the magnitude and direction components of the offset about the elevation and cross-elevation axes, converting these components to a RUM angular velocity cyclic component for superimposition on the nominal angular velocity component, and to a locus of the RUM 360 degree orbit where the peak of this cyclic component is to occur, accelerating the speed of the RUMS and decelerating the RUMs each cycle to produce the desired angular velocity, thereby modulating the angular velocity to generate a resultant torque vector each cycle whose direction is dependent upon the location of the locus in the RUM orbit where the peak of the cyclic component of the RUM angular velocity occurs, and which acts to compensate for the departure from the center-of-scan.

Although the determination of the locus in the RUM orbit where the peak of the cyclic component of the angular velocity occurs and the magnitude of this peak are within the skill of the art, it will also be helpful to describe one method for calibrating and determining these variables. It has been pointed out that the resultant torque vector magnitude is proportional to the magnitude of the cyclic component of the RUM angular velocity, and that its direction is a function of the locus in the orbit where this peak occurs. Considering first the direction of the torque vector, telescope-mounted attitude sensors indicate the orientation of the telescope line-of-sight (LOS) relative to its base, and all angles are calibrated to this 0 degree baseline. Attitude sensors, in the form of gimbal incremental encoders, measure changes in elevation and cross-elevation gimbal angles relative to this baseline. From these changes, every T seconds (e.g. T=0.0075 sec), the elevation and cross-elevation angles are estimated by summing the encoder outputs. The resulting estimated elevation and cross-elevation angles are denoted herein as $\theta_E(nT_{pscan}-jT)$ and $\theta_x(nT_{pscan}-jT)$, respectively, where $n=1,2,\ldots,j=0,1,2,\ldots,N-1$, and $T_{pscan}=NT$. These estimated angles, and the commanded elevation and cross-elevation angles at a time $nT_{pscan}-jT$, denoted by $\theta_{EC}(nT_{pscan}-jT)$ and $\theta_{XC}(nT_{pscan}-jT)$ respectively, can be used to calculate the errors in the scan center. The errors in the scan center at time $nT_{pscan}$, $Av\theta_{Ec}(nT_{pscan})$ and $Av\theta_{Xe}(nT_{pscan})$, can be derived from equations (1) and (2).

$$Av\theta_{Ee}(nT_{pscan}) = 1/N \sum_{j=0}^{N-1} [\theta_{EC}(nT_{pscan}-jT) - \theta_E(nT_{pscan}-jT)] \quad (1)$$

$$Av\theta_{Xe}(nT_{pscan}) = 1/N \sum_{j=0}^{N-1} [\theta_{XC}(nT_{pscan}-jT) - \theta_X(nT_{pscan}-jT)] \quad (2)$$

It will be noted that the errors in the scan center are an average (Av) of N instantaneous scan errors equally spaced in time over a RUM scan period. These errors in scan, or calculated averages, are components used in combination with the time rate-of-change of the scan errors as will be described.

The time rate-of-change of the scan errors are similarly derived. Tachometers measure the rate-of-change in the gimbal angles. The tachometer outputs are sampled every T seconds or N times over a scan period, $T_{pscan}$ seconds. These sampled tachometer outputs for the elevation and cross-elevation gimbals, denoted by $\Omega_E(nT_{pscan}-jT)$ and $\Omega_X(nT_{pscan}-jT)$ respectively, are subtracted from the commanded gimbal rates $\Omega_{EC}(nT_{pscan}-jT)$ and $\Omega_{XC}(nT_{pscan}-jT)$ to produce the gimbal rate errors, $\Omega_{Ee}(nT_{pscan}-jT)$, and $\Omega_{Xe}(nT_{pscan}-jT)$. These are averaged over N values in a RUM revolution to yield the following equations.

$$Av\Omega_{Ee}(nT_{pscan}) = 1/N \sum_{j=0}^{N-1} [\Omega_{EC}(nT_{pscan}-jT) - \Omega_E(nT_{pscan}-jT)] \quad (3)$$

$$Av\Omega_{Xe}(nT_{pscan}) = 1/N \sum_{j=0}^{N-1} [\Omega_{XC}(nT_{pscan}-jT) - \Omega_X(nT_{pscan}-jT)] \quad (4)$$

It can be seen that the differences between the actual and the commanded elevation and cross-elevation angles are averaged using equations (1) and (2) in order to obtain $Av\theta_{Ee}$ and $Av\theta_{Xe}$. In the same manner, $Av\Omega_{Ee}$ and $Av\Omega_{Xe}$ are determined using equations (3) and (4). Thus, once every scan period, which is $T_{pscan}$ seconds, equations (1) thru (4) are solved to yield the estimated scan errors, and the time rate-of-change of those errors. By using the values for the errors in the center-of-scan and the time rate-of-change of those errors derived from equations (1) thru (4), the parameters $\delta\Omega_{RP2}$ and $\delta\Omega_{RP3}$ can be determined. These parameters are the elevation and cross-elevation components of the desired amplitude for the cyclic component of the RUM angular velocity for the next RUM revolution. To find these parameters, the scan errors and error rates from equations (1) thru (4) are input into proportional-integral controllers with rate feedback. The integrals of the scan errors are thus determined by the following equations.

$$AvI_{Ee}(nT_{pscan}) = AvI_{Ee}[(n-1)T_{pscan}] + \theta_{Ee}(nT_{pscan}) \quad (5)$$

$$AvI_{Xe}(nT_{pscan}) = AvI_{Xe}[(n-1)T_{pscan}] + \theta_{Xe}(nT_{pscan}) \quad (6)$$

where initially $AvI_{Ee}(0) = AvI_{Xe}(0) = 0$.

From these integral values and the averages derived by equations (1) thru (4), $\delta\Omega_{RP2}$ and $\delta\Omega_{RP3}$ can be determined by equations (7) and (8).

$$\delta\Omega_{RP2}(nT_{pscan}) = k_R[k_p Av\theta_{Ee}(nT_{pscan}) + k_I AvI_{Ee}(nT_{pscan}) - Av\Omega_{Ee}(nT_{pscan})] \quad (7)$$

$$\delta\Omega_{RP3}(nT_{pscan}) = k_R[k_p Av\theta_{Xe}(nT_{pscan}) + k_I AvI_{Xe}(nT_{pscan}) - Av\Omega_{Xe}(nT_{pscan})] \quad (8)$$

The desired instantaneous value for the cyclic component of the RUM angular velocity in the (n+1) revolution of the RUMs is given by equation (9).

$$\delta\Omega_{RC}(nT_{PSCAN}+kT) = \delta\Omega_{RP3}(nT_{PSCAN})\cos[\theta_{RC}(nT_{PSCAN}+kT)] - \delta\Omega_{RP2}(nT_{PSCAN})\sin[\theta_{RC}(nT_{PSCAN}+kT)] \quad (9)$$

where $k=0, 1, 2, \ldots, N-1$. The angle $\theta_{RC}$ is the commanded RUM angle that the RUM servos are slaved to follow.

This control law specifies the additional, augmented, RUM rate, $\delta\Omega_{RC}(nT_{PSCAN}+kT)$, desired at a time $nT_{PSCAN}+kT$, to be added to the nominal commanded RUM rate, as determined from the elevation and cross-elevation components previously derived and described. This control law inherently generates the proper cyclic component of the RUM angular velocity, with proper magnitude and phase values, that produces a net torque over the (n+1) RUM cycle that acts to recenter the scan.

THE DRAWING

At this juncture it will be helpful to describe an instrument which is operated by rotating unbalanced-masses. One such instrument is shown in the accompanying drawing.

FIG. 1 is an isometric view of a double-gimballed scanning instrument showing the rotating unbalanced-masses and their rotation orbits.

SPECIFIC EMBODIMENTS

Gimbals can be mounted on a space station, a space shuttle, hung from a scientific balloon, or mounted firmly on the ground. However for the purposes of illustration herein, assume that the body or payload to be pointed, say a telescope 2, is supported by elevation and cross-elevation gimbals 4 and 6 respectively. The instrument or payload 2 is carried by a gimbal 6 through a known axle system which permits it to move horizontally relative to payload base 8. Cross-elevation gimbal ring 6 is carried by elevation gimbal 4 permitting vertical movement with respect to base 8. In some instances gimbal 6 will be a ring. In the embodiment herein the base of gimbal 4 is embedded in or secured to a platform 8. In order to permit payload movement the axle system includes two axle means 10 and 12. Herein axis 12 is the $P_3$ axis and 10 is the $P_2$ axis. In addition, to discuss front RUM 20 and rear RUM 22 are shown, along with the telescope line-of-sight (LOS) or $P_1$ axis. The front of the telescope, then, is the end depicting the direction of RUM rotation. When the line-of-sight of the instrument is perpendicular to the planes-of-rotation of the RUMs, the scan is circular. When the line-of-sight of the instrument is parallel to the planes-of-rotation of the RUMs, the scan is a linear scan.

Positioning and repositioning, or pointing, means, termed auxiliary control systems, are normally a part of a payload operated by RUMs. These include such elements as gears, stepper or torque motors, cams, pitman arms, linkages, and even pulleys. Herein all of those mechanical parts are eliminated and replaced by the operation of the RUMs as described hereinbefore.

Having been given the teachings of this invention, variations and ramifications will occur to those skilled in the art. Whereas a gimballed RUM instrument has been described, it will be appreciated that instrument-mounted optical attitude sensors and gyroscopic inertial rate sensors are available for use on freely suspended instruments, say in space, on tethers, or on balloons. Further, the method for determining the RUM cyclic angular velocity component can best be implemented in a computer program which can more readily iterate the functions and determine solutions to equations (1) thru (9). The key algorithms in the program are set forth in Table a at lines 236 to 356.

Table a

```
175 C
176         THRBC=THRC
177         THRBH=THRBC
178         THRBE=0.0
179         THRBEI=0.0
180 C
181         THGXCO=+00.00*DTR
182         THGXC=THGXCO-THGXCM*COS(THRC)
183         OMGXC=OMGXCM*SIN(THRC)
184         THGXH=THGXC-(10.0*DTR)
185         THGXEI=0.0
186 C
187
188         THGECO=00.00*DTR
189         THGEC=THGECO+THGECM*SIN(THRC)
190         OMGEC=OMGECM*COS(THRC)
191         THGEH=THGEC-(90.0*DTR)
192         THGEEI=0.0
193 C
194         DWRP3=0.0
195         DWRP2=0.0
196 C
197         OMGXEA=0.0
198         THGXEA=0.0
199         WGXIC=0.0
200         XN=1.0
201 C
202         OMGEEA=0.0
203         THGEEA=0.0
204         WGEIC=0.0
205         EN=1.0
206 C
207 C   INITIAL CONDITIONS FOR PLANT
208         THRA=THRAC
209         OMRA=0.0
210         TAURA=0.0
211 C
212         THRB=THRBC
213         OMRB=0.0
214         TAURB=0.0
215 C
216         THGX=THGXH
217         OMGX=0.0
218         OMGXM=0.0
219         TAUGX=0.0
220 C
221         THGE=THGEH
222         OMGE=0.0
223         OMGEM=0.0
224         TAUGE=0.0
225 C
226         DO 12 I=1,6
227  12     BB(I)=0.
228         TMIN=10.0
229         WRITE(2,15)
230  15     FORMAT (20X,'STEADY STATE CONDITIONS',/,25X,'PEAK VALUES',/,
231        *2X,'MA',2X,'T rum A',3X,'T rum B',5X,'T xel',3X,'T el',5X,'THETA
232        *xel',3X,'THETA el',5X,'POWER')
233 C  SIMULATION BEGINS HERE   *******************************************
234     100 CONTINUE
235 C
```

```
236 C   TEST FOR TIME TO CYCLE THRU CONTROL MICROPROCESSOR  *****************
237         IF(KNTC.GT.0)GO TO 200
238 C
239 C      READ INCREMENTAL ENCODER OUTPUTS:
240         DTHRA=THRA-THRAH
241         CALL QUANT(IQENC,ENCBTS,ENCRG,DTHRA,DTHRAQ)
242         DTHRB=THRB-THRBH
243         CALL QUANT(IQENC,ENCBTS,ENCRG,DTHRB,DTHRBQ)
244         DTHGX=THGX-THGXH
245         CALL QUANT(IQENC,ENCBTS,ENCRG,DTHGX,DTHGXQ)
246         DTHGE=THGE-THGEH
247         CALL QUANT(IQENC,ENCBTS,ENCRG,DTHGE,DTHGEQ)
248 C
249 C      UPDATE ESTIMATED PLANT STATES:
250         THRAH=THRAH+DTHRAQ
251         THRBH=THRBH+DTHRBQ
252         THGXH=THGXH+DTHGXQ
253         THGEH=THGEH+DTHGEQ
254 C
255 C      SOLVE CONTROL LAW EQS:
256 C       X-EL GIMBAL CONTROL LAW:
257         THGXC=THGXCO-THGXCM*COS(THRC)
258         OMGXC=+OMGXCM*SIN(THRC)
259         THGXE=THGXC-THGXH
260         OMGXE=OMGXC-OMGXM
261         THGXEA=(THGXEA*(XN-1.0)/XN)+(THGXE/XN)
262         OMGXEA=(OMGXEA*(XN-1.0)/XN)+(OMGXE/XN)
263         XN=XN+1.0
264 C
265 C       EL GIMBAL CONTROL LAW:
266         THGEC=THGECO+THGECM*SIN(THRC)
267         OMGEC=OMGECM*COS(THRC)
268         THGEE=THGEC-THGEH
269         OMGEE=OMGEC-OMGEM
270         THGEEA=(THGEEA*(EN-1.0)/EN)+(THGEE/EN)
271         OMGEEA=(OMGEEA*(EN-1.0)/EN)+(OMGEE/EN)
272         EN=EN+1.0
273 C
274 C       CORRECTION TERM FOR POINTING WITH RUM'S:
275         DWRC=DWRP3*COS(THRC)-DWRP2*SIN(THRC)
276         LDTHRC=DWRC*TS
277 C
278 C       RUM A SERVO CONTROL LAW:
279         DTHRAE=DTHRAC-DTHRAQ+LDTHRC
280         TRAC=IRAH*(KRR*DTHRAE+KRP*THRAE+KRI*THRAEI)
281         CALL QUANT(IQTQM,TQMBTS,TQMRG,TRAC,TRACQ)
282         TRAM=(1.0+CRTQM*(ABS(SIN(FRTQM*THRA))-1.0))*TRACQ
283 C
284 C       RUM B SERVO CONTROL LAW:
285         DTHRBE=DTHRBC-DTHRBQ+LDTHRC
286         TRBC=IRBH*(KRR*DTHRBE+KRP*THRBE+KRI*THRBEI)
287         CALL QUANT(IQTQM,TQMBTS,TQMRG,TRBC,TRBCQ)
288         TRBM=(1.0+CRTQM*(ABS(SIN(FRTQM*THRB))-1.0))*TRBCQ
289 C
290 C      FOR NEXT COMP CYCLE:
291 C        READ/COMPUTE NEW COMMANDS, IF CHANGED:
292         IF(T.LT.TCHNG)GO TO 150
293         DTHRC=2.0*DTHRC
294         DTHRAC=2.0*DTHRAC
295         DTHRBC=2.0*DTHRBC
296         OMGXCM=2.0*OMGXCM
297         OMGEC=OMGEC
298         TCHNG=T+DTCHNG
299     150 CONTINUE
300 C       UPDATE CONTROLLER STATES:
301         THRC=THRC+DTHRC
302         IF(ABS(THRC).LE.TWPI)GO TO 155
303         THRC=THRC-SIGN(TWPI,THRC)
```

```
304 C
305       OMGXEAS=OMGXEA
306       THGXEAS=THGXEA
307       WGXPC=KGXP*THGXEAS
308       IF(ABS(WGXPC).GT.WGXPCL)WGXPC=SIGN(WGXPCL,WGXPC)
309       WGXIC=WGXIC+KGXI*THGXEAS
310       IF(ABS(WGXIC).GT.WGXICL)WGXIC=SIGN(WGXICL,WGXIC)
311       DWRP3=KGXR*(WGXIC+WGXPC+OMGXEAS)
312
313 C
314       OMGEEAS=OMGEEA
315       THGEEAS=THGEEA
316       WGEPC=KGEP*THGEEAS
317       IF(ABS(WGEPC).GT.WGEPCL)WGEPC=SIGN(WGEPCL,WGEPC)
318       WGEIC=WGEIC+KGEI*THGEEAS
319       IF(ABS(WGEIC).GT.WGEICL)WGEIC=SIGN(WGEICL,WGEIC)
320       DWRP2=KGER*(WGEIC+WGEPC+OMGEEAS)
321 C
322       THGXEA=0.0
323       THGEEA=0.0
324       OMGXEA=0.0
325       OMGEEA=0.0
326       XN=1.0
327       EN=1.0
328 C
329   155 CONTINUE
330 C         RUM A:
331       THRAEI=THRAEI+THRAE
332       THRAE=THRAE+DTHRAE
333       THRAC=THRAC+DTHRAC
334       IF(ABS(THRAC).LE.TWPI)GO TO 160
335       THRAC=THRAC-SIGN(TWPI,THRAC)
336       THRA = THRA-SIGN(TWPI,THRAC)
337       THRAH=THRAH-SIGN(TWPI,THRAC)
338   160 CONTINUE
339 C
340 C         RUM B:
341       THRBEI=THRBEI+THRBE
342       THRBE=THRBE+DTHRBE
343       THRBC=THRBC+DTHRBC
344       IF(ABS(THRBC).LE.TWPI)GO TO 165
345       THRBC=THRBC-SIGN(TWPI,THRBC)
346       THRB = THRB-SIGN(TWPI,THRBC)
347       THRBH=THRBH-SIGN(TWPI,THRBC)
348   165 CONTINUE
349 C
350 C         X-EL GIMBAL:
351       THGXEI=THGXEI+THGXE
352 C         EL GIMBAL:
353       THGEEI=THGEEI+THGEE
354 C     RESET MICROCONTROLLER COUNTER
355       KNTC=KNTCM
356   200 CONTINUE
357 C
358 C  COMPUTE DISTURBANCE TORQUES & SUM WITH CONTROL TORQUES  *************
359       SA=SIN(THRA)
360       CA=COS(THRA)
361       SB=SIN(THRB)
362       CB=COS(THRB)
363       SX=SIN(THGX)
364       CX=COS(THGX)
365       SE=SIN(THGE)
366       CE=COS(THGE)
367 C
368       TRAD=+RMGA*(THGX*SA*SE-CA*CE)
369       TRAF=-TAURA
370       TRAT=TRAM+TRAF+TRAD
371 C
372       TRBD=-RMGB*(THGX*SB*SE-CB*CE)
373       TRBF=-TAURB
374       TRBT=TRBM+TRBF+TRBD
```

```
375 C
376       TGXD=DRMA*OMRA*OMRA*CA+DRMB*OMRB*OMRB*CB
377       TGXD=TGXD-MGA*SE*(DA*THGX+RA*CA)
378     1                +MGB*SE*(DB*THGX+RB*CB)
379       TGXF=-TAUGX
380       TGXT=TGXF+TGXD+TGXDIST
381 C
382       TGED=+MGA*(DA*CE+RA*SA*SE)-MGB*(DB*CE+RB*SB*SE)
383     1                -DRMA*OMRA*OMRA*SA-DRMB*OMRB*OMRB*SB
384       TGEF=-TAUGE
385       TGET=TGEF+TGED+TGEDIST
386 C
387 C COMPUTE DAHL MODEL PARAMETERS
388       DAHLRA=OMRA*SIG*(1.0-(SIGN(1.0,OMRA))*TAURA/TAUM)
389       DAHLRB=OMRB*SIG*(1.0-(SIGN(1.0,OMRB))*TAURB/TAUM)
390       DAHLGX=OMGX*SIG*(1.0-(SIGN(1.0,OMGX))*TAUGX/TAUM)
391       DAHLGE=OMGE*SIG*(1.0-(SIGN(1.0,OMGE))*TAUGE/TAUM)
392 C
393   300 CONTINUE
394 C
395 C COMPUTE STATE DERIVATIVES    ****************************************
396       THRAD=OMRA
397       OMRAD=TRAT/IRA
398       TAURAD=DAHLRA
399 C
400       THRBD=OMRB
401       OMRBD=TRBT/IRB
402       TAURBD=DAHLRB
403 C
404       THGXD=OMGX
405       OMGXD=TGXT/IGX
406       OMGXMD=WFTAC*(OMGX-OMGXM)
407       TAUGXD=DAHLGX
408 C
409       THGED=OMGE
410       OMGED=TGET/IGE
411       OMGEMD=WFTAC*(OMGE-OMGEM)
412       TAUGED=DAHLGE
413 C
414 C TEST FOR TIME TO STOP    *********************************************
415       IF(T.GT.TMAX)THEN
416       POWERR=(BB(1)/0.57)**2+(BB(2)/0.57)**2
417       POWERG=(BB(3)/0.61)**2+(BB(4)/0.61)**2
418       POWER=POWERR+POWERG
419       WRITE(2,5)MB,BB(1),BB(2),BB(3),BB(4),BB(5),BB(6),POWER
420     5 FORMAT(F4.3,6F10.6,5X,F5.2)
421       WRITE(3,50)IGXE,IGX,POWER,BB(5),BB(6)
422    50 FORMAT(F5.1,2X,F6.3,2X,F7.2,2X,F10.6,2X,F10.6)
423       WRITE(4,60)RAE,RA,POWER,BB(5),BB(6)
424    60 FORMAT(1X,6E10.3)
425       CALL STAT(SDAT1,NTOTPL,XMEAN,STDEV,RMS)
426       DUM=25.0
427       WRITE(7,60)DUM,XMEAN,STDEV,RMS
428       CALL STAT(SDAT2,NTOTPL,XMEAN,STDEV,RMS)
429       DUM=29.0
430       WRITE (7,60)DUM,XMEAN,STDEV,RMS
431       CALL STAT(SDAT3,NTOTPL,XMEAN,STDEV,RMS)
432       DUM=26.0
433       WRITE(7,60)DUM,XMEAN,STDEV,RMS
434       CALL STAT(SDAT4,NTOTPL,XMEAN,STDEV,RMS)
435       DUM=30.0
436       WRITE(7,60)DUM,XMEAN,STDEV,RMS
437       CALL STAT(SDAT5,NTOTPL,XMEAN,STDEV,RMS)
438       POWRMS=(RMS/0.57)**2
439       POWRMST=POWRMS
440       DUM=40.0
441       WRITE(7,60)DUM,XMEAN,STDEV,RMS,POWRMS,POWRMST
442       CALL STAT(SDAT6,NTOTPL,XMEAN,STDEV,RMS)
443       POWRMS=(RMS/0.57)**2
444       POWRMST=POWRMST+POWRMS
445       DUM=41.0
446       WRITE(7,60)DUM,XMEAN,STDEV,RMS,POWRMS,POWRMST
447       CALL STAT(SDAT7,NTOTPL,XMEAN,STDEV,RMS)
448       POWRMS=(STDEV/0.61)**2
```

```
449         POWRMST=POWRMST+POWRMS
450         DUM=42.0
451         WRITE(7,60)DUM,XMEAN,STDEV,RMS,POWRMS,POWRMST
452         CALL STAT(SDAT8,NTOTPL,XMEAN,STDEV,RMS)
453         POWRMS=(STDEV/0.61)**2
454         POWRMST=POWRMST+POWRMS
455         DUM=43.0
456         WRITE(7,60)DUM,XMEAN,STDEV,RMS,POWRMS,POWRMST
457         STOP
458         ENDIF
459 C
460 C   TEST FOR TIME TO PRINT & RESET KNTPR *********************************
461         IF(T.LT.0.0.OR.KNTPR.GT.0)GO TO 400
462 C
463 C   PRINT & RESET KNTPR *************************************************
464         KNTPR=KNTPRM
465 C
466     400 CONTINUE
467 C
468 C   TEST FOR TIME TO STORE VARIABLES FOR PLOTTING & RESET KNTPL ********
469         IF(T.LT.0.0.OR.KNTPL.GT.0)GO TO 500
470 C
471 C   STORE VARIABLES FOR PLOTTING & RESET KNTPL **************************
472         AA(1)=T
473 C
474         AA(2)=THRA
475         AA(3)=OMRA
476         AA(4)=TAURA
477 C
478         AA(5)=THRB
479         AA(6)=OMRB
480         AA(7)=TAURB
481 C
482         AA(8)=THGX*RTD
483         AA(9)=OMGX
484         AA(10)=OMGXM
485         AA(11)=TAUGX
486 C
487         AA(12)=THGE*RTD
488         AA(13)=OMGE
489         AA(14)=OMGEM
490         AA(15)=TAUGE
491 C
492 C
493         AA(16)=THRAC
494         AA(17)=THRAH
495         AA(18)=THRAE
496         AA(19)=THRAEI
497 C
498         AA(20)=THRBC
499         AA(21)=THRBH
500         AA(22)=THRBE
501         AA(23)=THRBEI
502 C
503         AA(24)=(THGXC-THGXCO)*RTD
504         AA(25)=(THGXH-THGXCO)*RTD
505         AA(26)=THGXE*RTD
506         AA(27)=THGXEAS*RTD
507 C
508         AA(28)=(THGEC-THGECO)*RTD
509         AA(29)=(THGEH-THGECO)*RTD
510         AA(30)=THGEE*RTD
511         AA(31)=THGEEAS*RTD
512 C
513         AA(32)=OMGXC
514         AA(33)=OMGEC
515 C
516         AA(34)=TRAC
517         AA(35)=TRBC
518         AA(36)=DWRP3
519         AA(37)=DWRP2
520 C
521         AA(38)=DWRC
522         AA(39)=LDTHRC
```

```
523 C
524        AA(40)=TRAM
525        AA(41)=TRBM
526        AA(42)=WGXPC*RTD
527        AA(43)=WGEPC*RTD
528 C
529        AA(44)=TRAF
530        AA(45)=TRBF
531        AA(46)=TGXF
532        AA(47)=TGEF
533        AA(48)=OMGXEAS*RTD
534        AA(49)=OMGEEAS*RTD
535 C
536 C   IPLSEL GIVES OPTION OF STORING SOME OTHER VARIABLES FOR PLOTTING
537        IF(IPLSEL.EQ.0)GO TO 450
538        AA(2)=THRAD
539        AA(3)=OMRAD
540        AA(4)=TAURAD
541 C
542        AA(5)=THRBD
543        AA(6)=OMRBD
544        AA(7)=TAURBD
545 C
546        AA(8)=THGXD
547        AA(9)=OMGXD
548        AA(10)=OMGXMD
549        AA(11)=TAUGXD
550 C
551        AA(12)=THGED
552        AA(13)=OMGED
553        AA(14)=OMGEMD
554        AA(15)=TAUGED
555 C
556    450 CONTINUE
557        WRITE(1,452)AA
558        NTOTPL=NTOTPL+1
559        SDAT1(NTOTPL)=AA(25)
560        SDAT2(NTOTPL)=AA(29)
561        SDAT3(NTOTPL)=AA(26)
562        SDAT4(NTOTPL)=AA(30)
563        SDAT5(NTOTPL)=AA(40)
564        SDAT6(NTOTPL)=AA(41)
565        SDAT7(NTOTPL)=AA(42)
566        SDAT8(NTOTPL)=AA(43)
567    452 FORMAT(6E10.4)
568        IF (T.LT.TMIN)GO TO 455
569 C      WRITE(40,*)AA(40)
570 C      WRITE(41,*)AA(41)
571 C      WRITE(42,*)AA(42)
572 C      WRITE(43,*)AA(43)
573 C      WRITE(26,*)AA(26)
574 C      WRITE(30,*)AA(30)
575        CALL ARRFIL(AA,BB)
576    455 CONTINUE
577        KNTPL=KNTPLM
578 C
579    500 CONTINUE
580 C
581 C   TEST FLAG IN MODIFIED-EULER INTEGRATION ROUTINE  *******************
582        IF(INTFLG.GT.0)GO TO 600
583 C
584 C   PROJECT STATES & UPDATE INT. ROUTINE FLAG  ***************************
585        DO 505 I=1,N
586        XP(I)=X(I)
587        XDP(I)=XD(I)
588    505 X(I)=XP(I)+XDP(I)*DT
589        INTFLG=1
590        GO TO 300
591 C
592    600 CONTINUE
```

```
593 C
594 C   UPDATE STATES & TIME; RESET INT. ROUTINE FLAG; DECREMENT COUNTERS  **
595         DO 605 I=1,N
596         XDP(I)=0.5*(XDP(I)+XD(I))
597  605    X(I)=XP(I)+XDP(I)*DT
598  620    T=T+DT
599         INTFLG=0
600         KNTC=KNTC-1
601         IF(T.GE.0.0)KNTPR=KNTPR-1
602         IF(T.GE.0.0)KNTPL=KNTPL-1
603         GO TO 100
604         END
605 C*****************************************************************
606         SUBROUTINE QUANT(IQFLG,NBITS,XMAX,X,XQ)
607         XQ=X
608         IF(IQFLG.EQ.0)GO TO 20
609         XLSB=(2.0*XMAX)/(2.0**NBITS)
610         XMAXP=XMAX-XLSB
611         XMIN=-XMAX
612         XDUM=XQ
613         IF(XDUM.LT.XMIN)XDUM=XMIN
614         IF(XDUM.GT.XMAXP)XDUM=XMAXP
615         XDUM=XDUM+XMAX+XLSB/2.0
616         XDUM=XDUM/XLSB
617         IXDUM=XDUM
618         XDUM=IXDUM
619         XDUM=XDUM*XLSB
620         XQ=XDUM-XMAX
621   20    CONTINUE
622         RETURN
623         END
624 C*****************************************************************
625         SUBROUTINE ARRFIL(AA,BB)
626         REAL AA(50),BB(6)
627 C       IF(T.LT.TMIN)GO TO 20
628         IF(ABS(AA(40)).GT.BB(1)) BB(1)=ABS(AA(40))
629         IF(ABS(AA(41)).GT.BB(2)) BB(2)=ABS(AA(41))
630         IF(ABS(AA(42)).GT.BB(3)) BB(3)=ABS(AA(42))
631         IF(ABS(AA(43)).GT.BB(4)) BB(4)=ABS(AA(43))
632         IF(ABS(AA(26)).GT.BB(5)) BB(5)=ABS(AA(26))
633         IF(ABS(AA(30)).GT.BB(6)) BB(6)=ABS(AA(30))
634 C  20   CONTINUE
635         RETURN
636         END
637 C*****************************************************************
638         SUBROUTINE STAT(X,NTOTPL,XMEAN,STDEV,RMS)
639         DIMENSION X(NTOTPL)
640         XMEAN=0.0
641         XMEANSQ=0.0
642         DO 10 I=1,NTOTPL
643         RI=I
644         RIM1=RI-1.0
645         RATIO=RIM1/RI
646         XMEAN=(RATIO*XMEAN)+(X(I)/RI)
647   10    XMEANSQ=(RATIO*XMEANSQ)+(X(I)*X(I)/RI)
648         RMS=SQRT(XMEANSQ)
649         STDEV=SQRT(XMEANSQ-(XMEAN*XMEAN))
650         RETURN
651         END
652 C*****************************************************************
```

EXAMPLE 1

The program in Table a was used for a telescope with inertias $I_E=I_X=26$ slug-ft$^2$ and RUMs, each with a mass m=5 lb, mounted a distance d=2.5 ft from the center of gravity of the telescope. The RUM lever arm lengths were r=0.5 ft, and the scan period was $T_{pscan}=1$ sec. The control computer computation cycle time was T=0.0075 sec. Control law parameters were $k_I=0$, $k_p=0.44$, and $k_R=19$.

Assuming now that the telescope was initially mispointed −1 degree=−0.01745 radian in both the elevation and cross-elevation axes, then the control algorithms, equations (1) thru (9), solved by the program (see lines 236 to 356) yield the following numerical results at T=1 sec.

$Av\theta_{Ee}(1\ sec)=+0.01745$ rad
$Av\theta_{Xe}(1\ sec)=+0.01745$ rad
$Av\Omega_{Ee}(1\ sec)=0.0$
$Av\Omega_{Xe}(1\ sec)=0.0$
$AvI_{Ee}(1\ sec)=0.0$
$AvI_{Xe}(1\ sec)=0.0$
$\delta\Omega_{RP2}(1\ sec)=0.146$ rad/sec
$\delta\Omega_{RP3}(1\ sec)=0.146$ rad/sec Over the next scan cycle the results are:

$$\begin{aligned}\delta\Omega_{RC}(1+kT) &= 0.146\cos(\theta_{RC}) - 0.146\sin(\theta_{RC}) \\ &= 0.146\cos(\Omega_{RC}kT) - 0.146\sin(\Omega_{RC}kT) \\ &= 0.146\cos(2\pi kT) - 0.146\sin(2\pi kT)\end{aligned}$$

where kT=0.0075 sec, 0.015 sec, . . . , 0.9925 sec.

The nominal RUM rate, $\Omega_{RCN}$, is equal to $2\pi/T_{pscan}=6.28$ rad/sec. Hence the next scan cycle will have a total RUM rate of $$\begin{aligned}\Omega_{RCT}(1+kT) &= \Omega_{RCN}+\Omega_{RC}(1+kT) \\ &= 6.28+0.146\cos(2\pi kT)-0.146\sin(2\pi kT)\end{aligned}$$

It can be seen that by the practice of this invention the center-of-scan can be positioned accurately and automatically merely by the use of customary encoders and tachometers. In addition to utilizing RUMs for both pointing and scanning by the invention in order to eliminate the need for an auxiliary control system to keep the scan on target, a momentum desaturation system is not required. The RUMs do not momentum saturate as do reaction wheels and CMGs. And although a platform has been shown in the drawing for the purpose of illustration, RUMs used for pointing and scanning do not require gimbals and a base structure to torque against. A space-based, balloon-borne, or ground-based payload can be attached by means of a cable, a tether, or a rigid arm provided with a ball-and-socket or universal joint. The entire system is thus simplified. The use of RUMs for pointing and scanning insures that a gravity-gradient stabilized satellite stays pointed at the earth in spite of aerodynamic torques which tend to tumble or spin it. RUMs utilized as described herein can also potentially eliminate unwanted motions, such as skip rope motions and pendulous vibrations of tethered satellites. Use of RUMs for pointing and scanning according to this invention thus provides a far-reaching potential for the future of pointing control systems for free-flying spacecraft/satellites and space-based/balloon-borne/ground-based payloads.

What is claimed is:

1. A method for positioning and repositioning, that is pointing, a scanning instrument when the instrument is offset from a center-of-scan thereof and must be pointed to that center, wherein the instrument is a type whose scanning is accomplished by rotating unbalanced-masses (RUMS) rotating in fixed axes rotation relative to and associated with the instrument, and wherein the rotating unbalanced-mass instrument has first and second rotatable unbalanced-masses supported on respective drive shafts spaced from the center-of-mass of the instrument, and adapted to rotate 180 degrees out-of-phase with each other, with planes-of-rotation thereof parallel to each other, and at a constant nominal angular velocity so that centrifugal forces caused by rotation of the RUMs create a time-varying relatively large-amplitude/high-frequency reaction forces and torques which act on the instrument to move its line-of-sight in a predetermined, repetitive, scan pattern, the pointing method including the steps of: measuring elevation and cross-elevation angles and the rate-of-change of these angles to determine any offset and offset time rate-of-change, calibrating magnitude and direction components of the offset about elevation and cross-elevation axes, converting these components to a RUM cyclic angular velocity component on top of the nominal velocity, and to a locus of the RUM 360 degree orbit where a peak of this cyclic component is to occur, accelerating the speed of the RUMS and decelerating the RUMs each cycle to produce the required angular velocity, thereby modulating the angular velocity to generate a torque which when combined with the high-frequency torque produces a resultant torque vector each cycle whose direction is dependent upon the location of the locus in the RUM orbit where a peak of the cyclic component of the RUM angular velocity occurs, and which acts to compensate for the offset from the center-of-scan.

2. The pointing method of claim 1 wherein the line-of-sight of the instrument is perpendicular to the planes-of-rotation of the RUM masses.

3. The pointing method of claim 1 wherein the line-of-sight of the instrument is parallel to the planes-of-rotation of the RUM masses.

4. The pointing method of claim 1 wherein the speed of the RUMs is gradually increased and decreased during each revolution to achieve the required magnitude and direction of the resultant torque vector for recentering the scan.

5. The pointing method of claim 1 wherein the elevation and cross-elevation angles and their rates-of-change are differenced with desired values thereof and then averaged over each RUM orbit to determine the offset in the scan center and the time rate-of-change of this offset.

6. The pointing method of claim 5 wherein the averaging and RUM angular velocity modulation steps are iterated over several cycles, with each approaching the required center-of-scan position, and continuing the iteration until the required center-of-scan position is reached.

* * * * *